Sept. 1, 1931.  H. J. HECK  1,821,890
SHIFTER MECHANISM
Filed Aug. 9, 1930
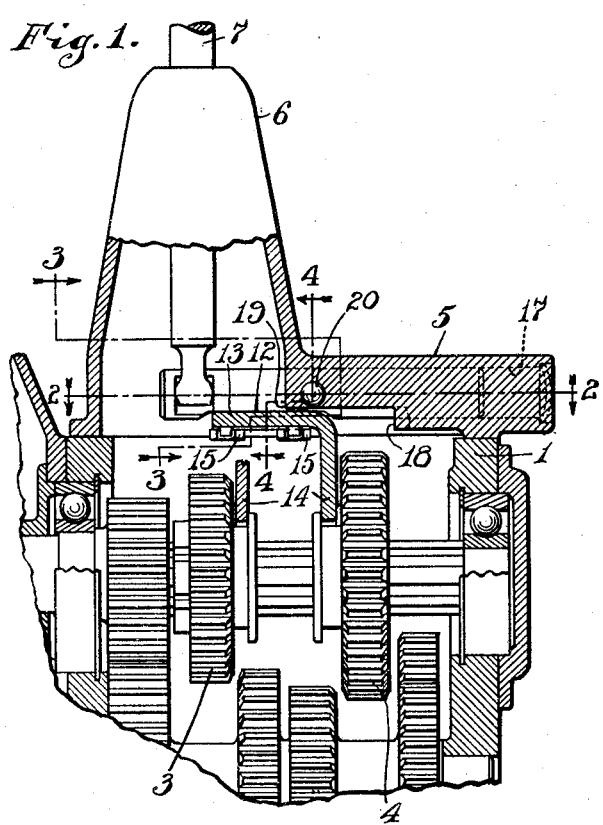
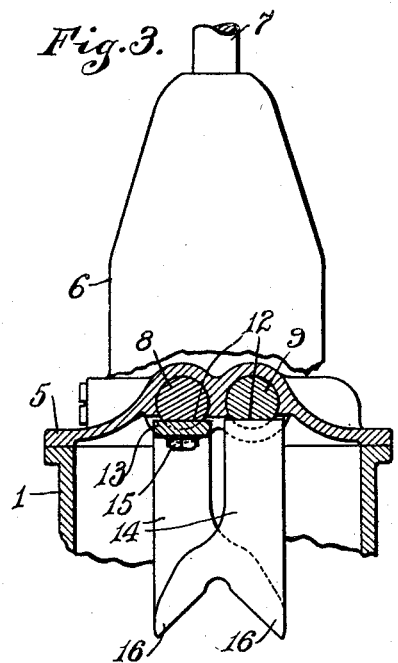
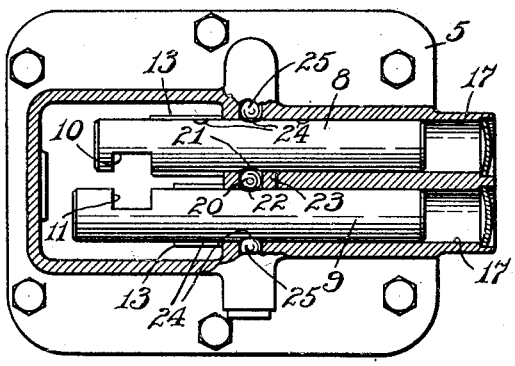
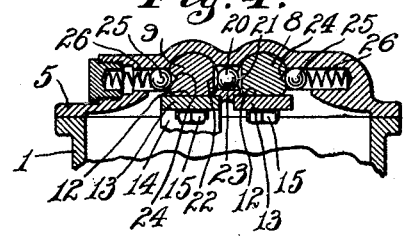
INVENTOR.
Harry J. Heck,
BY
Hood & Hahn.
ATTORNEYS Patented Sept. 1, 1931

1,821,890

UNITED STATES PATENT OFFICE

HARRY J. HECK, OF MUNCIE, INDIANA, ASSIGNOR TO WARNER GEAR COMPANY, OF MUNCIE, INDIANA, A CORPORATION OF INDIANA

SHIFTER MECHANISM

Application filed August 9, 1930. Serial No. 474,268.

My invention relates to improvements in automobile transmissions and particularly to the mechanism for shifting the transmission.

My invention has for one of its objects that of providing a shifting mechanism wherein the shifter rails are mounted in a cheap and efficient manner, which will provide for the maximum support of the rail and which at the same time will permit of the maximum shifting movement thereof.

Another object of my invention is to so simplify the entire shifting mechanism that it may be cheaply and readily manufactured.

For the purpose of disclosing my invention I have illustrated one embodiment thereof in the accompanying drawings in which:

Fig. 1 is a longitudinal sectional view of a transmission embodying my invention;

Fig. 2 is a sectional view of the casing top on line 2—2 of Fig. 1;

Fig. 3 is a transverse sectional view on the line 3—3 of Fig. 1; and

Fig. 4 is a transverse sectional view on the line 4—4 of Fig. 1.

In the embodiment illustrated I provide a transmission which may be of the standard commercial structure including a casing 1 and the usual speed gears 3 and 4. I have not elaborated the construction and arrangement of the transmission as this is a well known structure.

A top or cover plate 5 for the transmission casing is provided with the usual shifter leyer dome 6 in which is mounted the shifter lever 7. This lever is adapted to engage the shifter rails 8 and 9 which, at their forward ends, have notches 10 and 11 for receiving the lower end of the shifter lever 7. Each of these rails on its under side is flattened off as at 12 to provide a flat surface to which the horizontal arm 13 of a shifter fork 14 is secured by means of bolts 15. This fork is preferably formed from a sheet metal stamping and its vertical arm is provided with fingers 16 adapted to fit within an annular groove of the gear to be shifted. Each of the shifter rods is supported at its rear end in a guide opening 17 extending longitudinally of the top 5, being preferably formed in bosses made integrally with the top. The walls of these openings completely surround the rails up to the point 18, but beyond this point and to the point 19 the under faces of the walls are cut off just sufficient to accommodate the movement of the arms 13. It will be noted, however, from Fig. 3 that these walls extend beneath the center line of the rod so that while clearance is provided for the arm 13, there is still provided a support for the rod or rail.

The rods or rails are interlocked to prevent one from being moved by means of a ball 20 interposed between the rails and seating in recesses 21 and 22 in the two rails, the depth of these recesses being such that when one rail is moved and shifts the ball out of its recess, it will be shifted into the other recess, the ball being held against longitudinal movement by the walls of the opening in the lug 23 in which the ball is arranged.

For spotting the position of the rails, each rail is provided with a plurality of drilled spot recesses 24 into which a ball 25 is urged by a suitable coiled spring 26.

I claim the following:

1. In a transmission, the combination with a casing, a cover member therefor having elongated cylindrical bearings therein, transmission shifter rails slidably mounted in said bearings and shifter forks mounted on the under side of said rails, the walls of said bearings being cut away on their under side for a part of their lengths to accommodate said shifter forks.

2. In a transmission, the combination with a casing, of a cover member therefor having elongated cylindrical bearings therein, shifter rails slidably mounted in said bearings and shifter forks mounted on the under side of said rails, the walls of said bearings being cut away on their under side for a part of their lengths and below the horizontal center of the rails to accommodate said shifter forks.

3. In a transmission casing, a cover member therefor having elongated cylindrical bearings therein, shifter rails slidably mounted in said bearings having notches in their forward ends to receive the end of a shifter lever, and shifter forks mounted on the under side of said rails, the walls of said bearings being cut away on the under side for a part of their lengths to accommodate said shifter forks.

4. In a transmission, the combination with a casing, of a cover member therefor having elongated cylindrical bearings therein, shifter rails slidably mounted in said bearings, said rails at their forward end being notched to receive the end of a shifter lever and having on their under side flattened surfaces, shifter forks secured on said flattened surfaces, the walls of said bearings being cut away on the under side thereof for a part of their lengths to accommodate said shifter forks.

In witness whereof, I, HARRY J. HECK have hereunto set my hand at Muncie, Indiana, this 5th day of August, A. D. one thousand nine hundred and thirty.

HARRY J. HECK.